Dec. 17, 1940.    D. R. BERLIN    2,225,094
AIRPLANE
Filed Nov. 3, 1937

INVENTOR
DONOVAN R. BERLIN.
BY
ATTORNEY

Patented Dec. 17, 1940

2,225,094

UNITED STATES PATENT OFFICE 2,225,094

AIRPLANE

Donovan R. Berlin, Eggertsville, N. Y., assignor to Curtiss-Wright Corporation, a corporation of Delaware Application November 3, 1937, Serial No. 172,550

4 Claims. (Cl. 244—13)

This invention relates to a novel type of aircraft, and is particularly concerned with improvements in the organization of a fuselage, on an aircraft wing, along with the disposition of the power plants with relation to the fuselage.

Objects of the invention are to improve the aerodynamic characteristics of a multi-engine aircraft, and to so dispose the components of the aircraft that improved visibility is afforded for the pilot or aircraft crew.

A further object is to so dispose the power plants and fuselage as to cause a minimum of aerodynamic interference one with the other, resulting in reduced drag and increased speed.

Still another object is to so dispose the fuselage and power plants that the lift of the aircraft wing is not seriously interfered with.

Further objects will be apparent from a reading of the annexed specification and claims and from an examination of the accompanying drawing, in which:

Figure 1:
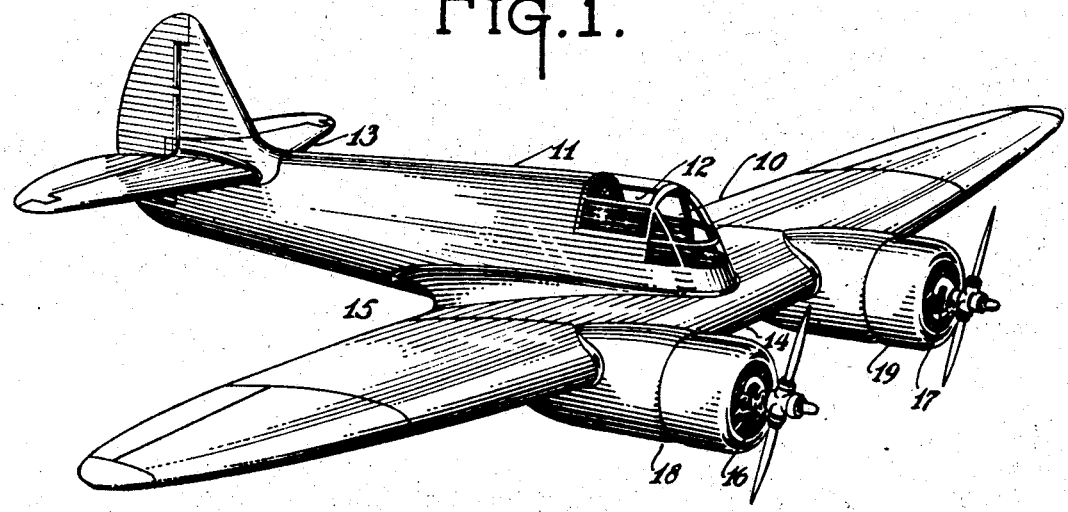
Fig. 1 is a perspective view of an aircraft according to the invention.

The aircraft comprises a main cantilever wing 10, to the center of which a fuselage 11 is suitably attached, the fuselage being provided with a crew compartment 12 at its forward end, and the usual empennage 13 at its rearward end, the fuselage 11 being a streamlined body. The crew compartment 12 forms the front of the fuselage, and this is disposed aft of the leading edge 14 of the wing 10, the cockpit being combined with the wing at the thick part thereof which is normally about one-third of the wing cord rearward of the leading edge. Ordinarily, the aircraft fuselage is extended well forward of the leading edge of the wing and embraces same, whereas in this invention, the wing leading edge is free from interference by the fuselage proper, whereby normal lifting air flow is permitted on the lower center section of the wing, and lifting air flow is likewise inherent on the forward part of the top surface of the wing in front of the fuselage. Naturally, the fuselage will be faired into the wing as at 15 in the conventional manner.

The invention contemplates the use of two or more power plants, two being shown in the drawing as indicated at 16 and 17, these being laterally disposed on either side of the plane of symmetry of the aircraft. The power plants are housed in streamlined nacelles 18 and 19 which project forwardly from the leading edge of the wing and which are so disposed that the axis of respective power plants is below the wing cord, with the result that the bulk of each engine nacelle is essentially below the wing. This disposition leaves the top surface of the wing substantially uninterrupted, permitting maximum lateral vision for the pilot. A suitable retractable landing gear may be housed in a manner well known in the art, within the nacelles 18 and 19, such landing gear being diagrammatically indicated at 20.

With the fuselage extending essentially above the wing, and with the nacelles extending essentially below the wing, a minimum of air flow interference is occasioned between respective power plants and the fuselage, while the nacelles themselves are sufficiently far apart so that there is little interference of air flow between nacelles. Accordingly, a decrease in drag is obtained by the arrangement, as well as an increase in lift by virtue of the fuselage disposition as previously described, and by virtue of the relatively clear top surface of the wing in the vicinity of the nacelles. It is well known that the majority of lift obtainable from a wing results from less than atmospheric pressure on the wing upper surface, and with the wing upper surface clear above the nacelles, accordingly greater lift may be materialized.

Figure 2:
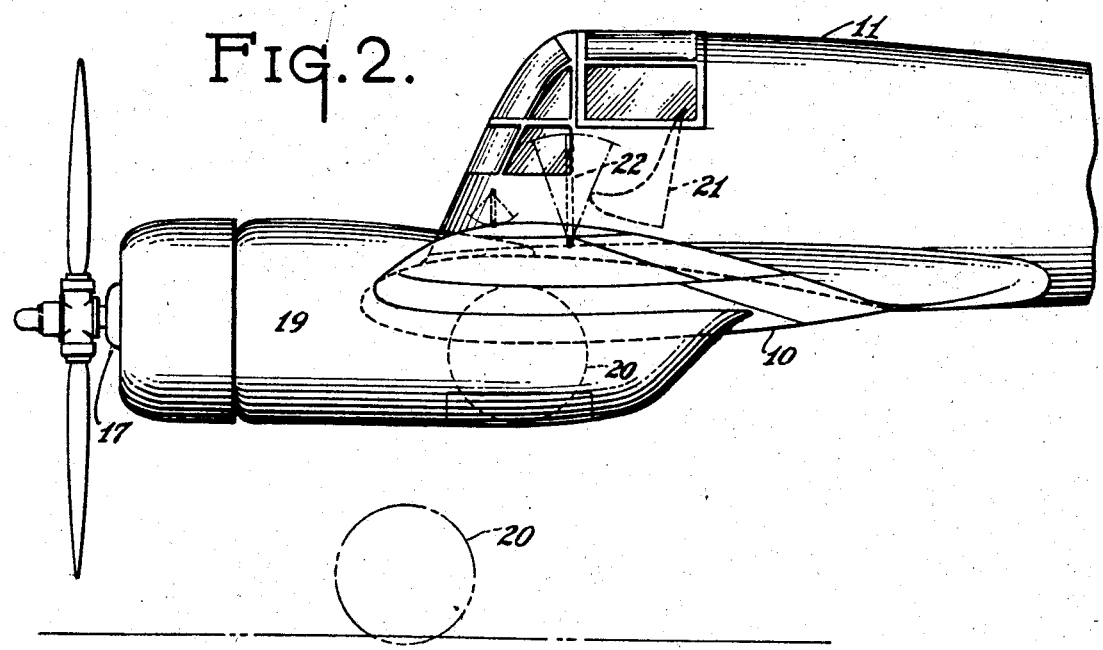
Fig. 2 is a side elevation of the front part of such an aircraft.

Fig. 2 shows diagrammatically the disposition of a pilot's seat 21 and control stick 22 as appropriate to a two-motored aircraft of the attack type. Obviously, the proportions of the aircraft may be varied according to the purpose for which it is to be used, but the advantages flowing from improved aerodynamic characteristics and improved visibility for the pilot will be attained regardless of the size of the aircraft as a whole.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. Aircraft comprising a main cantilever wing, power plant nacelles disposed along the leading edge thereof in symmetrical relation to the center of the wing span, the power plant axes being below the wing chord line and the power plant cowling being predominantly below the wing, and a central fuselage predominantly above the wing, said fuselage terminating, at its forward end, rearwardly of the wing leading edge.

2. An aircraft comprising a main cantilever wing, a fuselage carried thereby extending rearwardly therefrom and terminating at its front end rearward of the wing leading edge and the fuselage throughout its length being above the wing, providing at its forward end a pilot's cockpit, and power plant nacelles symmetrically disposed on said wing in laterally spaced relation to said fuselage, the bulk of said nacelles being predominantly forward of and below the wing.

3. In aircraft, in combination, an elongated streamlined fuselage, a cantilever wing extending across the forward end thereof, the front of the fuselage lying rearward of the wing leading edge and the fuselage throughout its length being above the wing, providing at its forward end a pilot's cockpit, and streamlined power plant nacelles extending from the wing leading edge forwardly, the nacelles being transversely spaced from the aircraft plane of symmetry.

4. In aircraft, in combination, a fuselage having crew accommodations at the extreme forward end thereof, a wing attached thereto and lying partly forward of and partly beneath the forward fuselage end, whereby the crew may see forwardly and downwardly over the wing leading edge, and power plant nacelles carried by said wing, outboard of the fuselage, the bulk of said nacelles being on the opposite side of said wing from the fuselage, whereby minimum interference with airflow is occasioned by the fuselage and nacelles.

DONOVAN R. BERLIN.